Figure 1:
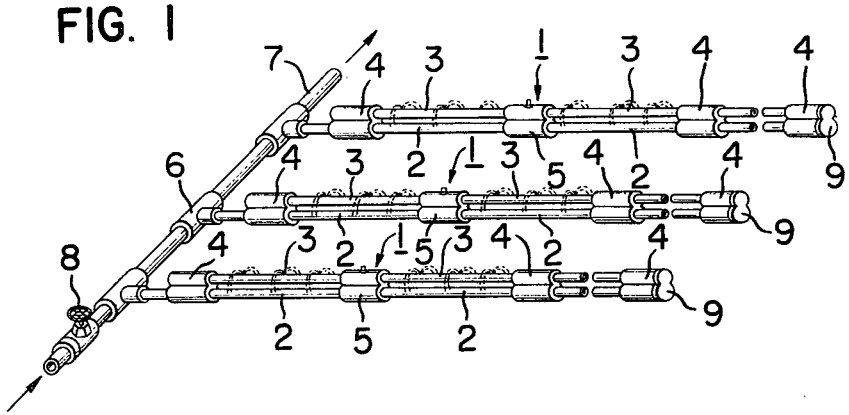

United States Patent [19]

Hane

[11] 4,162,041
[45] Jul. 24, 1979

[54] LIQUID SPRINKLING DEVICE OF COMPOSITE PIPE TYPE

[75] Inventor: Shinichi Hane, 251-6, Oaza Muranaka, Komaki-Shi, Aichi-ken, Japan

[73] Assignees: Yamshita & Associates Ltd.; Shinichi Hane, both of Tokyo, Japan

[21] Appl. No.: 768,883

[22] Filed: Feb. 15, 1977

[30] Foreign Application Priority Data

Feb. 19, 1976 [JP] Japan .................................. 51/17353
May 22, 1976 [JP] Japan .............................. 51/64701[U]
May 22, 1976 [JP] Japan .............................. 51/64702[U]

[51] Int. Cl.² ............................................... A01G 27/00
[52] U.S. Cl. .................................... 239/266; 239/450; 239/542; 239/547
[58] Field of Search ............... 239/66, 266, 268, 442, 239/444, 450, 542, 547, 562, 565, 581, 582, 586; 251/148; 137/625.47

[56] References Cited

U.S. PATENT DOCUMENTS

| 1,534,406 | 4/1925 | Martocello | 251/148 X |
| 3,036,783 | 5/1962 | Hansen | 239/547 X |
| 3,547,355 | 12/1970 | Salazar | 239/547 |
| 3,672,571 | 6/1972 | Goodricke | 239/450 X |
| 4,055,232 | 10/1977 | Moore | 137/625.47 |

FOREIGN PATENT DOCUMENTS

253123 12/1946 Switzerland .............................. 239/562

Primary Examiner—Robert W. Saifer
Attorney, Agent, or Firm—Haseltine, Lake & Waters

EXEMPLARY CLAIM

1. A liquid sprinkling system employing connection sockets, each of said sockets comprising: a tubular connection portion for connection of a main pipe and at least one tubular connection for connection of a sub-pipe, said main pipe and said sub-pipe being connected between an associated connection socket; said tubular main pipe connection portion and tubular sub-pipe connection portion communicating with each other through an opening disposed proximate a central portion thereof, said sub-pipe connection portion having a single opening for allowing liquid to flow only in one particular axial direction along an axis of said sub-pipe connection portion and an internal closure inside thereof, for preventing flow of liquid in an opposite axial direction of the sub-pipe connection portion; adjusting means for adjusting a flow rate of liquid passing through said opening proximate said central portion; each of said connection sockets being further defined by a cylindrical guide wall inside said sub-pipe connection portion extending at the peripheral edge of said opening up to an upper internal surface of the sub-pipe connection portion and said single opening in the sub-pipe connection portion being a hole provided at one of two diametrically opposing positions thereon in an axial direction of the sub-pipe connection portion, and said flow rate adjusting means being a plug rotatably received in a space defined by said guide wall and provided with a hole flush with said hole in the guide wall being in communication with said opening, said plug being accessible for flow rate control from the outside of said connection socket.

4 Claims, 12 Drawing Figures

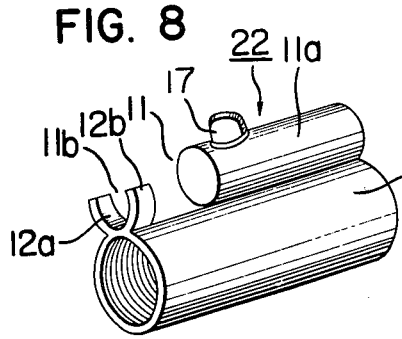
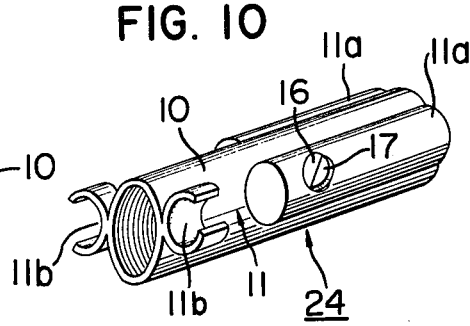
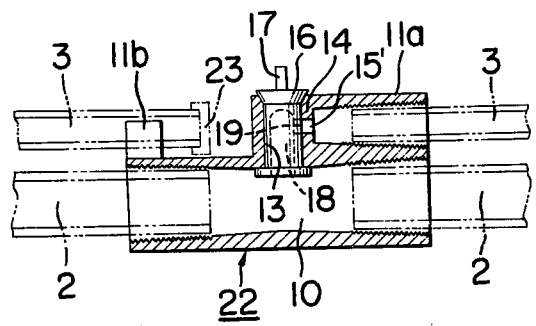
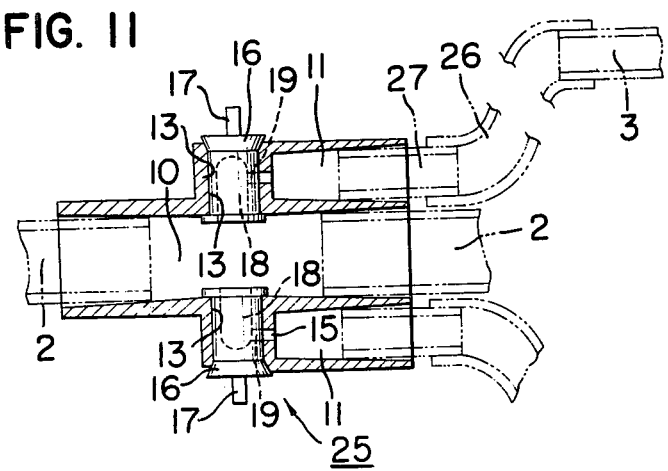

LIQUID SPRINKLING DEVICE OF COMPOSITE PIPE TYPE

The present invention is related to the improvement of a liquid sprinkling device, and particularly to a liquid sprinkling device of composite pipe type capable of adjusting the amount of liquid to be sprinkled which device includes a plurality of unit pipes connected by connection sockets.

Liquid sprinkling devices such as water sprinkling devices have now been finding extensive applications in the fields of agriculture, horticulture and in golf courses. A typical example of such liquid sprinkling devices is such that water is caused to emit from many holes formed on the pipe under the influence of liquid pressure for sprinkling the liquid in the area along the pipe. In the liquid sprinkling devices which are now in use, there develops difference in pressure of liquid flowing in the pipe along its length. More particularly, liquid pressure decreases gradually from the portion of the pipe near the water supply pipe towards the portion of the pipe remote from the water supply pipe. This results in different coverage of the area in which the water is sprinkled, i.e., different water sprinkling distance. In other words, sprinkling distance is larger in the area near the water-supply pipe and smaller in the area remote from the water-supply pipe. Therefore, the water sprinkling distance changes along the water sprinkling device or the pipe. For example, where the water sprinkling device is installed along ridges in an agricultural field, there develops inconvenience in that water or liquid fertilizer is not properly supplied to the agricultural plants.

It is therefore desired to uniformalize water spray or sprinkling distance by adjusting the amount of water to be spurted. Contrary to this, it is also required to change intentionally the amount of water to be spurted unequally. One example is that it is desired to supply more water to the area receiving abundant sunshine in the facilities of horticulture.

One of attempts so far made to uniformalize the coverage of sprinkling of the liquid spurted from the liquid sprinkling device was to provide two or three main pipes instead of one main pipe to minimize pressure difference in the lengthwise direction of the liquid sprinkling device. According to such attempt, however, provision of main pipes is expensive and requires a lot of labor for establishment. Another attempt was to insert fine rods into the holes of the pipe in the lateral direction thereof so that the liquid will drop along the rods. This approach may give satisfactory effects to some extent in the point that pressure difference of the liquid supplied does not affect the dropping distance; but supply of liquid by way of rods does not give so desirable results. Furthermore, as the most effective method, there has been proposed a water sprinkling device utilizing a double-pipe. The double-pipe is an elongated pipe divided by a separator wall in its lengthwise direction into two chambers one having a large cross section and the other having a small cross section, whereby the former serves as a main pipe and the latter as a sub-pipe, the main pipe and the sub-pipe being communicated by way of communication holes for every unit length. The main pipe is served from the master pipe with liquid to be sprinkled. The water or liquid introduced to the main pipe flows into the sub-pipe through the communication holes and is sprinkled from the spurting holes that are formed on the surface of the sub-pipe. The opening area of the communication holes is adjusted from the outside of the double-pipe by means of adjustment bolt to adjust the flow rate of liquid introduced from the main pipe to the sub-pipe for every unit length of the double-pipe, to thereby adjust the sprinkling distance. For each unit length of the double-pipe, the main pipe is open at its both ends and the sub-pipe is closed at its both ends. Hence, where a plurality of double-pipes are connected in series to constitute a water sprinkling device, the main pipes are communicated throughout their entire length, but the sub-pipes are closed for each unit length. It is therefore possible to adjust the amount of the liquid to be spurted, i.e. sprinkling distance for each unit length by effecting adjustment by means of adjustment screws at the respective portions of the pipe which differ in distance from the master pipe of the liquid sprinkling device. This approach employing a double-pipe may be far superior to the aforesaid first and second approaches, however, the double-pipe is very difficult to manufacture and inspection of the separator wall formed between the main pipe and the sub-pipe requires very troublesome work. Where the pipe is made of a synthetic resin, the degree of circle of the double-pipe is lost in the manufacturing step, especially in the cooling step in which shrinkage occurs on the separator wall, giving rise to development of clearance at the connection parts of the tubes and inviting leakage of liquid. Moreover, since the sub-pipe is closed at its both ends for every unit length, it is hard to clean the inside of the sub-pipe after it has been manufactured. This is very inconvenient, because the dust and dirt which have entered into the sub-pipe or impurities contained in the liquid that is to be sprinkled, are accumulated in the sub-pipe over long periods of use, causing spurting holes of the sub-pipe to be clogged, and reducing the life of the double-pipe or the life of the liquid sprinkling device.

The present invention provides a liquid sprinkling device of composite pipe type which is free of the aforementioned drawbacks inherent in the sprinkling devices employing double-pipes.

In the liquid sprinkling device of composite pipe type according to the present invention, the setup comprises a connection socket of first type including a tubular main pipe connection part and a tubular sub-pipe connection part, said connection parts being united to each other at a part of periphery of each connection part and said tubular sub-pipe connection part having an internal closure nearly at its central part; a connection socket of second type including a tubular main pipe connection part and a tubular sub-pipe connection part, said connection parts being united to each other at a part of periphery of each connection pipe and being communicated with each other through an opening nearly at its central portion, said connection of second type further including a means for adjusting the amount of liquid passing through the opening to be sprinkled; and main pipes and sub-pipes to be connected between said connection sockets of first type and second type, said sub-pipe having a plurality of holes from which the liquid spurts.

According to another liquid sprinkling device of the present invention, the setup comprises a connection socket including a tubular main pipe connection part and a tubular sub-pipe connection part and main pipes and sub-pipes connected between said connection sockets, said connection parts being united to each other at a part of periphery of each connection part and being communicated with each other through an opening nearly at its central portion, said tubular sub-pipe connection part having an internal closure for interrupting flow of the liquid in one direction of the sub-pipe connection part, and said connection socket including a means disposed near the opening for adjusting the amount of liquid passing through the opening and flowing in the opposite direction of the sub-pipe connection part.

As seen from the foregoing, the liquid sprinkling device of composite pipe type according to the present invention employs either of the arrangement wherein a connection socket of first type having an internal closure in its sub-pipe connection part and a connection socket of second type with its sub-pipe connection part communicating in both longitudinal directions with the main pipe connection part are used alternatingly and a main pipe and a sub-pipe are connected between the connection sockets of first type and second type or the arrangement wherein a connection socket of different type having its sub-pipe connection part communicating in only one longitudinal direction with the main pipe connection part is used and a main pipe and a sub-pipe are connected between the connection sockets of said different type. The liquid supplied from one end of the device through the main pipe is introduced to the connection socket of second type or to the connection socket of said different type and then supplied to the sub-pipe. The amount of liquid flow passing through the opening is adjusted by a flow-adjustment means provided on these connection sockets, to adjust the sprinkling distance of the liquid spurted from the sub-pipe.

According to the present invention, the liquid sprinkling device is divided into sections along its length each section consisting of two main pipes and two sub-pipes demarcated by two successive connection sockets of second type or one main pipe and one sub-pipe demarcated by two successive connection sockets of different type and the amount of liquid is adjusted in each section of the device at the connection socket of second type or the connection socket of different type. It is thus possible to adjust the amount or sprinkling distance of liquid to be spurted for each section of the device independently.

In the above water sprinkling device, connection of the main pipe and sub-pipe to connection sockets is accomplished by insertion of the ends of the main pipe and sub-pipe into tapered connection parts of the connection sockets or by screw-fitting of threaded end portions of the main pipe and sub-pipe into threaded portions formed on the connection parts of the connection sockets. Connection by means of screw-fitting is especially effective when the pressure of a liquid to be sprinkled is high. For a water sprinkling device of a large scale, the screw-fitting connection or insertion connection combined with adhesive is usually employed. Even in case of a water sprinkling device of a small scale, it is not usual practice to disassemble the device once it is set up.

As the liquid sprinkling device of this type is used, there is a tendency of pipes to clog at their spurting holes and liquid sprinkling performance of the device gradually deteriorates. Clogging is caused by not only dust and sludge contained in the supplied liquid but also inorganic substance such as fur and organic substances such as pond scum and algae generated in the pipes during the use. Conventional liquid sprinkling devices are customarily used with a dust removing filter called "strainer" to remove foreign substances coming from the outside of the pipes. However, even with the filter of this kind, complete dust removal cannot be attained, and if the mesh size of a filter used is made finer, in order to enhance the dust removal efficiency, filters must be exchanged with new ones frequently.

The present invention provides an improvement in the above-mentioned conventional liquid sprinkling device according to which improvement the sprinkling device, especially the sub-pipe portion, can be effectively cleaned in the set-up state while enjoying the essential advantages that difference in pressure of the liquid can be compensated. This improvement also permits easy connection of main pipes and sub-pipes made of a material poor in flexibility. A connection socket improved from the above viewpoint according to the present invention comprises a tubular connection part for a main pipe and at least one tubular connection part for a sub-pipe, said sub-pipe connection part including a tubular portion for connection of the sub-pipe and a sub-pipe holding portion, said two portions of the sub-pipe connection part are spaced from each other in the axial direction of the connection socket, the tubular portion for connection of the sub-pipe is communicated with said tubular part for connection of the main pipe through an opening and has an open hole for introducing a liquid flowing from the tubular part for connection of the main part through said opening, into one longitudinal direction of the connection socket, a means for adjusting the amount of the liquid passing through said opening from the outside disposed in the vicinity of said opening, and the sub-pipe holding portion is fixed to the tubular main pipe connection part to hold loosely the sub-pipe by its elastic force. The tubular main pipe connection and the tubular sub-pipe connection portion are tapered or threaded at their inner surfaces so that the main pipe and the sub-pipe (at one end thereof) are connected to the connection socket without any leakage of the liquid. The other end of the sub-pipe is loosely held by the sub-pipe holding portion by an elastic holding force thereof. This other end of the sub-pipe is closed by any closing member such as a dismountable plug or a cap, and the closing member is dismounted when the sub-pipe is cleaned.

The connection socket is preferably formed of a thermoplastic synthetic resin such as a vinyl chloride resin by injection molding or may be formed of a metal such as iron or cast iron by casting or forging. The sub-pipe holding portion may be molded integrally with the main pipe connection part of the connection socket or it may be formed separately in advance and fixed to the outer wall of the main pipe connection part. In any case, the sub-pipe holding portion can hold loosely the sub-pipe by an elastic holding force so that the sub-pipe can freely be dismounted.

According to the above structure of the connection socket of the present invention, cleaning of the sub-pipe can be accomplished very easily and a fatal defect of the liquid sprinkling device, i.e. clogging, can be eliminated and long period of use of the liquid sprinkling device can be enjoyed. Moreover, the main pipe and sub-pipe having poor flexibility because of large thickness or material in use can easily be connected by either screw-fitting or insertion fitting. Therefore, the liquid sprinkling device of the present invention can be suitably applied to not only water sprinkling for horticultural or agricultural on large scales but also melting of snow and ice on roads and railways and irrigation of deserts and waste lands, and the amount of water to be sprinkled can be adjusted irrespective of the liquid pressure.

The present invention also provides an improvement of the liquid sprinkling device having the above structure in which liquid can be sprinkled uniformly along a long distance in a broad region. The liquid sprinkling device improved from this viewpoint comprises a connection socket having a special structure, a main pipe connected to this connection socket, at least one sub-pipe having a plurality of spurting holes, and a sub-pipe connection conduit for connecting the sub-pipe to the connection socket, wherein the sub-pipe is disposed on at least one side of the main pipe at a position spaced from the main pipe by a desirable distance. Each sub-pipe has a plurality of spurting holes arranged in two rows on the sub-pipe equidistantly along the lengthwise direction thereof. Two rows of the spurting holes are spaced circumferentially so that liquid can be sprinkled on both sides of the sub-pipe. Accordingly, by changing the distance between the sub-pipe and the main pipe appropriately, the region in which water sprinkling is possible can be changed as desired. If it is desired to further broaden the water sprinkling region, it is only sufficient to increase the number of sub-pipes to be disposed on both the sides of the main pipe. In this case, it is preferred that a branched type sub-pipe connecting member be used as means for connecting each sub-pipe to the main pipe.

According to the present invention, a fine conduit or tool used for the Melloner process or as a drip pipe is not needed and hence, a troublesome assembling operation required for such fine conduit need not be performed. Instead, it is sufficient to merely change the distance between the sub-pipe and the main pipe at the assembling step to sprinkle the liquid over a region of desired width. Still further, it is possible to realize uniform sprinkling along the lengthwise direction of the liquid sprinkling device by controlling a flow rate adjusting cock mounted on the connection socket, and if desired, it is possible to change intentionally the amount of the liquid sprinkled along the lengthwise direction of the liquid sprinkling device.

Figure 2:
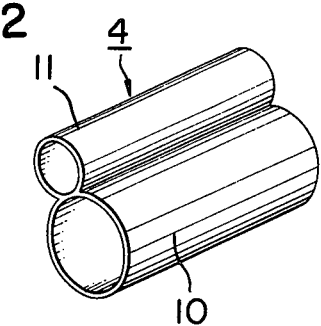
Figure 3:
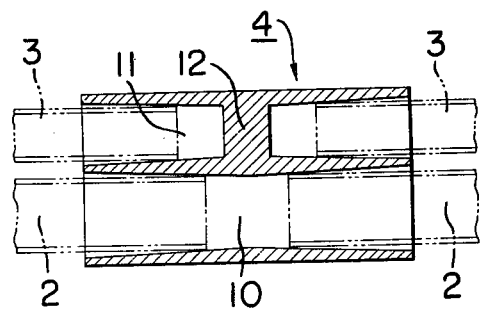
Figure 4:
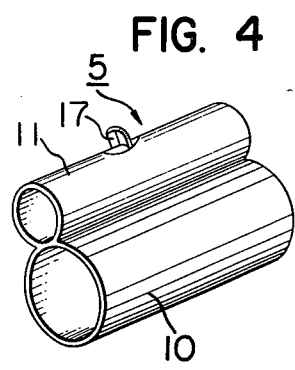
Figure 5:
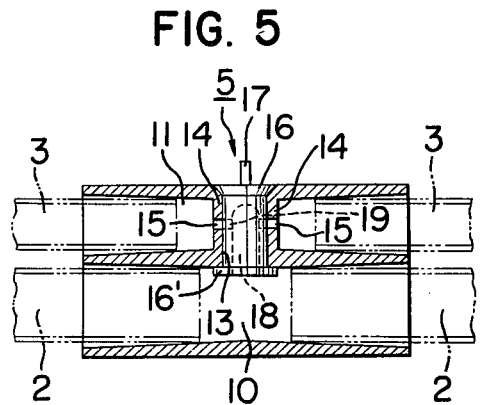
Figure 6:
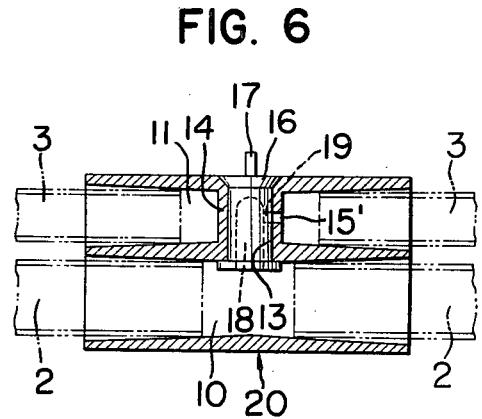
Figure 7:
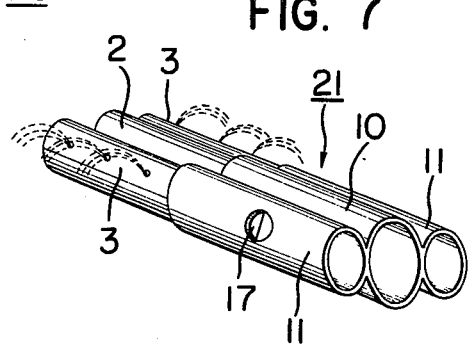

The invention will now be described in more detail with reference to the accompanying drawings in which;

FIG. 1 is a view showing the way in which the water sprinkling device of the present invention is actually operated with a first embodiment of a connection socket used, FIG. 2 is a perspective view of a connection socket of first type constituting the first embodiment of FIG. 1;

FIG. 3 shows a longitudinal section of the connection socket of first type shown in FIG. 2, FIG. 4 is a perspective view of a connection socket of second type constituting the first embodiment of FIG. 1, FIG. 5 shows a longitudinal section of the connection socket of second type shown in FIG. 4, FIG. 6 shows a longitudinal section of a second embodiment of the connection socket used in the water sprinkling device according to the present invention, FIG. 7 is a perspective view showing a modification of the second embodiment of the connection socket shown in FIG. 6, FIG. 8 is a perspective view showing a third embodiment of the connection socket used in the water sprinkling device of the present invention, FIG. 9 shows a longitudinal section of the third embodiment shown in FIG. 8, FIG. 10 is a perspective view showing a modification of the third embodiment of the connection socket shown in FIG. 9, FIG. 11 shows a longitudinal section of a fourth embodiment of the connection socket used in the water sprinkling device of the present invention.

Figure 12:
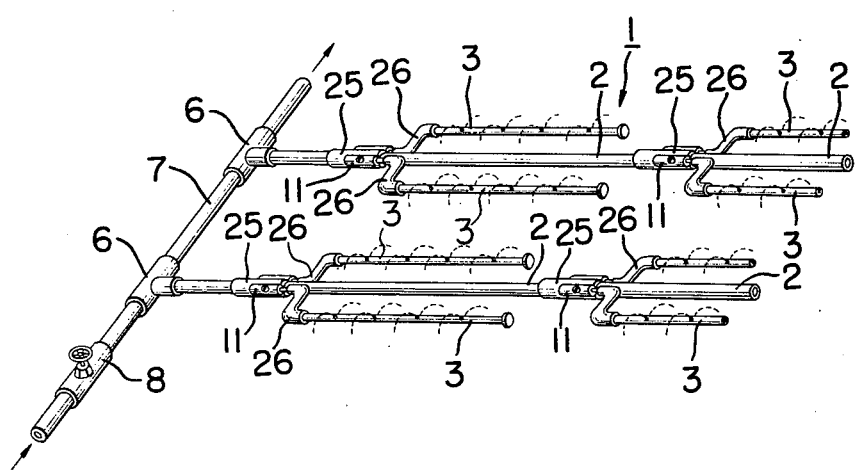

FIG. 12 is a view showing the way in which the water sprinkling device using the fourth embodiment of the connection socket is actually operated.

Referring to FIG. 1 of the drawings, there is shown an example of three water sprinkling devices arranged in parallel to each other.

The water sprinkling device 1 of the present invention consists of a plurality of main pipes 2 and sub-pipes 3 connected by means of connection sockets of first type 4 and connection sockets of second type 5 alternately. At both extreme ends of the device are attached the connection sockets of first type 4. Each water sprinkling device 1 is served with liquid to be sprinkled from the master pipe 7 via a branch socket 6. The supply of liquid to the water sprinkling device is stopped by a valve 8 that is provided in the master pipe 7. At least the main pipe connection part of the connection socket of first type 4 disposed on the side opposite to the liquid supply side of the sprinkling device 1, has a cap 9 to interrupt the flow of liquid.

The connection socket of first type 4 and the connection socket of second type 5 are produced, for example, by injection-molding of a thermoplastic synthetic resin such as vinyl chloride, etc.

The connection socket of first type 4 consists of a main pipe connection part 10 for connecting the main pipe 2 and a sub-pipe connection part 11 for connecting sub-pipe 3. Each connection part is tapered to be smaller in inner diameter toward the inner side of the socket as seen from FIG. 3, for the purpose that the main pipes and sub-pipes are securely connected to the respective connection parts of the connection socket without inviting leakage of liquid. The main pipe connection part 10 is hollow and is penetrating. The sub-pipe connection part 11, on the other hand, has a closure part 12 nearly at the central part to shut off the passage of liquid flow.

The connection socket of second type 5, like the connection socket of first type 4, consists of a main pipe connection part 10 and a sub-pipe connection part 11 as shown in FIG. 4, but these two connection parts 10 and 11 are communicated with each other at their center via an opening 13. Along the periphery of the opening 13 is formed a cylindrical guide wall 14 which is upstanding up to the upper inner wall of the sub-pipe connection part 11. Holes 15, 15 are formed on the sides of the guide wall 14 in the sub-pipe connection part 11. The main pipe connection part 10 is communicated to the sub-pipe connection part 11 toward its two lengthwise directions via said opening 13 and the holes 15, 15. Inside the cylindrical guide wall 14 is fitted a cylindrical flow-adjustment cock 16 maintaining a freedom of frictional rotation. On the flow-adjustment cock 16 is formed a knob 17, and inside thereof is formed a hole 18 that can be extended near to the upper wall in the axial direction. Two opposing flow holes 19, 19 are also formed at positions opposite to the holes 15, 15 of said cylindrical guide wall 14 to communicate to the inner hole 18. The adjustment cock 16 has on its lower surface a flange 16' of a small height; when the adjustment cock 16 is put into the space defined by the guide wall 14, the flange 16' fits to the inner wall of the main pipe connection part 10 so as not to be pulled out upward by the liquid pressure or by any other force. The adjustment cock 16 should preferably be made of rubber or synthetic resin as a single unit. If the flow-adjustment cock 16 is turned by gripping the knob 17, relative relationship between the holes 15, 15 of the guide wall 14 and the holes 19, 19 of the cock 16 continuously varies, so that the amount of the liquid flowing from the main pipe connection part 10 to the sub-pipe connection part 11 via the opening 13 is changed. If the hole 15 is completely deviated from the hole 19, it is possible to completely shut off the flow of liquid into the sub-pipe.

By the way, in putting the aforementioned water sprinkling device into practice, the main pipe connection part is formed with a flare support widening toward its bottom or a leg is attached to the bottom of the main pipe connection part for the purpose of stably installing the device on the field.

The main pipe 2 and the sub-pipe 3 are inserted into the main pipe connection part 10 and the sub-pipe connection part 11 of the connection socket of first type 4 and the connection socket of second type 5, respectively. It is essential that the connection socket of first type 4 and the connection socket of second type 5 are employed alternately as shown in FIG. 1.

The sub-pipe 3 has a plurality of spurting holes that are formed maintaining every definite distance. As an example, the main pipe 2 has an outer diameter of 18 mm and an inner diameter of 15 mm, and the sub-pipe 3 has an outer diameter of 11 mm and an inner diameter of 8 mm, and both of these pipes are 2 meters in length. The sub-pipe 3 may have spurting holes formed a distance of every 10 cm, 20 cm, or 40 cm, apart from each other. The size of the injection holes will be, for example, from 0.8 to 1.0 mm in diameter. The liquid to be sprinkled is supplied from the master pipe 7 and introduced to the initial connection socket of second type 5 through the connection socket of first type 4 and the main pipe 2. In the connection socket of second type 5, the liquid flows in both axial directions of the sub-pipe connection part 11 from the main pipe connection part 10 through the opening 13, flow holes 19, 19 of the adjustment cock 16 and through holes 15, 15 of the guide wall 14. The liquid is then sprinkled from the spurting holes of the sub-pipes 3, 3 that are connected to both sides of the connection socket of second type 5. Distance of sprinkling can be adjusted by turning the flow-adjustment cock 16 of the connection socket of second type 5. The sprinkling device has been divided to a plurality of sections each consisting of two sub-pipes 3, 3 connected with the connection socket of second type 5 at its both sides. Hence, the flow rate can be adjusted independently at every section to make constant the sprinkling distance regardless of the distance from the master pipe 7, i.e., regardless of the pressure difference.

Another embodiment of the connection socket is illustrated in FIG. 6.

FIG. 6 shows a connection socket 20 which is different from the aforesaid connection sockets of first type and second type. The connection socket 20 is very close in structure to the aforesaid connection socket of second type 5. Only difference is that a hole 15' is formed on either side of the diametrically opposing sides facing the sub-pipe connection part 11 of the cylindrical guide wall 14. In this connection socket 20, the main pipe connection part 10 is communicated to the sub-pipe connection part 11 in only one direction (toward right in the drawing) but shut off in the other direction (left in the drawing). The flow-adjustment cock 16 is manipulated quite in the same manner as described in connection with the connection socket of second type.

To set up the water sprinkling device of the present invention using the connection socket 20, the main pipes 2 and the sub-pipes 3 should be connected among a plurality of connection sockets 20. Unlike the aforementioned embodiment in which the connection socket of first type 4 and the connection socket of second type 5 are used alternately, the connection socket 20 is used by itself and brings about quite the same effects. A plurality of connection sockets 20 have to be connected all in the same direction with respect to the sub-pipe connection part 11. That is to say, the hole 15' formed in the guide wall 14 of all the connection sockets 20 connected successively may be directed toward downstream of the liquid flow in the sprinkling device 1 or toward upperstream of the liquid flow. In this embodiment, the water sprinkling device 1 is divided into sections by the neighboring two connection sockets 20, 20, and the amount of liquid spurted from the sub-pipe 3 is controlled in every section by means of the flow-adjustment cock 16, which is quite the same as the aforementioned embodiment. Furthermore, it is possible to make constant the sprinkling distance regardless of the pressure difference. Here, a cap is used to close the main connection part 10 of the terminal connection socket 20 of the water sprinkling device 1.

Below are summarized advantages of the water sprinkling device of the present invention over the conventional water sprinklers employing double-tubes.

(1) The connection sockets 4, 5 are manufactured by way of the injection molding quite easily and uniformly. Since ordinary pipes can be utilized as main pipes and sub-pipes, there is no problem of controlling the quality of the conventional double-pipes in manufacturing process. Therefore, manufacturing cost can be reduced.

(2) Both the main pipe and the sub-pipe are open at their ends and permit cleaning. The connection socket can also be cleaned. This results in extension of life of the sprinkling device. Whereas, with the conventional double-pipe sprinklers in which the two ends of the sub-pipe are closed, the dirt which has entered the pipe or the foul accumulated therein are never removed, causing the life of the device to be shortened.

(3) Since pipes having high circular degree are employed, there is no leakage of the liquid at the connection parts as compared with the conventional double-pipe devices of which degree of circularity was prone to be lost during the step of manufacturing.

Further, where a water sprinkling device is constituted using a connection socket 21 composed of two sub-pipe connection parts 11 on both sides of the main pipe connection part 10 as shown in FIG. 7, the sub-pipes 3, 3 can be connected to the sub-pipe connection parts 11, 11 of the socket 21 at any desired angular position, to change the direction of sprinkling of water as desired. This connection socket can be applied to the aforementioned two embodiments. For the first embodiment, the connection socket 21 has to possess two kinds of internal constructions, i.e., first type and second type as shown in FIGS. 3 and 5. For the second embodiment, the connection socket 21 has to possess the internal construction as shown in FIG. 6.

FIG. 8 is a perspective view of the third embodiment of a connection socket to be used in the water sprinkling device of the present invention where one main pipe and one sub-pipe are used.

A connection socket 22 comprises a tubular connection part 10 for connection of a main pipe and a connection part 11 for connection of a sub-pipe and is integrally formed from a synthetic resin such as a vinyl chloride resin by injection molding. The tubular main pipe connection part 10 has both the ends opened and each of the inner faces of both the ends is threaded as apparently seen from FIG. 9 illustrating the longitudinal section of the connection socket 22. The sub-pipe connection part 11 includes a tubular portion 11a and a sub-pipe holding portion 11b, and one end of the tubular portion 11a is opened and the inner face thereof is threaded. The tubular portion 11a is communicated with the tubular main pipe connection part 10 through an opening 13 in the vicinity of the other side of the tubular portion 11a. The mechanism for communicating the main pipe connection part 10 with the tubular portion 11a of the sub-pipe connection part 11 and the flow rate adjusting operation are the same as those illustrated hereinbefore with respect to the second embodiment shown in FIG. 6 and accordingly explanation of such communicating mechanism and flow rate adjusting operation is omitted.

The sub-pipe holding portion 11b is integrally formed on the upper periphery of the end portion of the main pipe connection part 10, and the portion 11b has a short cylindrical shape whose inner diameter is substantially equal to the outer diameter of the sub-pipe 3 but about ¼ of the outer diameter is notched. When one end of the sub-pipe 3 is pushed between the so formed two arms 12a and 12b, the arms 12a and 12b are slightly expanded and the sub-pipe 3 snaps into between the arms 12a and 12b and is loosely held by an elastic returning force.

When it is desired that the main pipe 2 and sub-pipe 3 are connected to the connection socket 22, one connection socket 22 is screwed at the main pipe connection part 10 to one end of the main pipe 2 and then, another connection socket 22 is screwed at the main pipe connection part 10 to the other end of the main pipe 2, whereby the connection sockets 22 are connected to both the ends of the main pipe 2. Then, the sub-pipe 3 is arranged in parallel to and in proximity with the main pipe 2, and the end of the sub-pipe 3 which is closed by a cap 23 is put into snap engagement between the arms 12a and 12b of the sub-pipe holding portion 11b of one connection socket 22 having the end thereof already connected to the main pipe 2. The open end of the sub-pipe 3 is screwed to the tubular portion 11a of the other connection socket 22 already connected to the main pipe 2. Since the sub-pipe holding force of the arms 12a and 12b of the sub-pipe holding portion 11b is not so strong, the sub-pipe 3 can easily be rotated even while one end of the sub-pipe 3 is being held by the holding portion 11b and therefore, the other end of the sub-pipe 3 can be screwed to the round tubular portion 11a of the connection socket 22. In this manner, both the ends of each of the main pipe 2 and sub-pipe 3 can be connected to the connection socket 22. In the same manner as described above, main tubes 2 and sub-pipes 3 are connected in succession to connection socket 22.

Cleaning of the thus assembled water sprinkling device 1 is performed in the following manner.

To perform cleaning of main pipes 2, a knob 16 of a flow rate adjusting cock 17 for each connection socket 22 is turned to intercept the passage to the sub-pipe 3 and a cleaning liquid such as clean water is forced to flow only in the main pipe 2 to effect cleaning thereof. When it is desired that sub-pipes 3 are to be cleaned, the cap 23 mounted on one end of each sub-pipe is taken off and the knob 16 of the flow rate adjusting cock 17 is turned to open entirely the passage to the sub-pipe 3 and to allow the cleaning liquid to flow through the sub-pipe 3, whereby dust or the like which may have been deposited and accumulated on the interior surface of the sub-pipe 3 are washed and carried away by the cleaning liquid and discharged from the open end of the sub-pipe 3.

FIG. 10 is a perspective view showing a modification of the third embodiment of the connection socket in which a connection socket 24 is adapted to be used with a single main pipe and two sub-pipes. Two sub-pipe connection parts 11 are disposed on both sides of a tubular part 10 for connection of the main pipe, and each sub-pipe connection part 11 includes a tubular portion 11a and a sub-pipe holding portion 11b. Each sub-pipe connection part 11 is disposed in the same positional relationship to the main pipe connecting part 10 as in the foregoing third embodiment shown in FIGS. 8 and 9, accordingly, explanation of this positional relationship is omitted. Further, the manner of connection of the main pipe and two sub-pipes to the connection socket 24 is the same as illustrated and explained hereinbefore with reference to FIG. 9 and hence, explanation thereof is omitted.

The fourth embodiment of the connection socket used in the water sprinkling device of the present invention which is arranged so that water can be sprinkled in a broader region will now be described by reference to FIG. 11.

As shown in FIG. 11, a connection socket 25 comprises a tubular part 10 for connection of a main pipe 2 and two round tubular parts 11, 11 for connection of a sub-pipe 3 which are disposed on both sides of the main pipe connection part 10. The main pipe connection part 10 is connected at both ends to main pipes 2. The length of each sub-pipe connection part 11 in the axial direction is a little longer than ½ of the main pipe connection part 10 and each sub-pipe connection part 11 is connected only at one end thereof to the sub-pipe 3, while the other end is closed. The internal structure and connecting mechanism of each of the connection parts 10 and 11 are the same as in the connection sockets of the embodiments hereinbefore illustrated, and hence, illustration is omitted. In the embodiment shown in FIG. 11, the main pipe 2 is directly inserted into the connecting part 10 but the sub-pipe 3 is connected to the connection part 11 through a sub-pipe connecting member 26. This sub-pipe connecting member 26 is composed of a soft hose or the like and the length thereof can optionally be changed. The sub-pipe connecting member 26 is connected to the sub-pipe connection part 11 through a sub-pipe connecting tube 27 which may be composed of the same material as that of the connecting socket 25, for example, a synthetic resin and is connected liquid-tightly to the sub-pipe connection part 11 by screw fitting or insertion fitting. In addition to the foregoing method using the sub-pipe connecting member 26 and sub-pipe connecting tube 27, there may be considered a method for connecting the sub-pipe 3 to the sub-pipe connection part 11 in which steps are formed on the periphery of the terminal portion of the sub-pipe connection part 11 of the connection socket 25 and the sub-pipe connecting member 26 is directly fitted in this stepped portion.

In the foregoing manner, the main pipe 2 is directly connected to the main pipe connection part 10 of the connection socket and the sub-pipe 3 is connected to the sub-pipe connection part 11, whereby one unit of the water sprinkling device is constructed. The other end of the sub-pipe 3 is closed by a cap or plug. If this cap or plug is taken out, dust, sand and sludge accumulated inside the sub-pipe can be removed appropriately.

In the foregoing fourth embodiment of the present invention, a connection socket including two sub-pipe connection parts 11 disposed on both sides of the main pipe connection part 10 is used, but the socket that can be used in the water sprinkling device of the present invention is not limited to such socket. For example, in the present invention there may be adopted a connecting method in which a connection socket including only one sub-pipe connection part and one main pipe connection part, a T-shaped branched socket (so-called cheese socket) and an L-shaped socket (so-called elbow socket) are connected to the sub-pipe connecting member 26 and sub-pipe connecting tube 27 through soft hoses and sub-pipes are connected to these sockets, respectively, whereby two or more of sub-pipes can be arranged only on one side of the main pipe. This pipe connecting method using T-shaped and L-shaped sockets can be applied to a connection socket of the type as shown in FIG. 11. In this case, at least two sub-pipes can be arranged on each side of the main pipe and water can be sprinkled in a broader region.

FIG. 12 shows in a perspective manner the way in which the fourth embodiment of the connection socket is actually operated. In this embodiment, length of the sub-pipe connecting tube for connecting the sub-pipe to the sub-pipe connection part of the connection socket, and spacing of the sub-pipe from the main pipe can optionally be adjusted and water sprinkling can be performed over a broad region as desired. Further, water can be sprinkled uniformly with respect to the lengthwise direction of the water sprinkling device by adjusting the knob of the flow rate adjusting cock.

In the foregoing embodiment, it has been mentioned that each of the main pipe, sub-pipe and connection socket is formed of a synthetic resin. More specifically, the connection socket is preferably a rigid mold article having a thickness of about 2 mm, which is formed of a thermoplastic synthetic resin such as a vinyl chloride resin by injection molding, and the main pipe and sub-pipe may be formed of the same rigid material as that of the connection socket or they may be soft tubes having a thickness of about 0.2 mm to 2.0 mm, which are formed of a synthetic resin material such as polyethylene, polypropylene or the like by extrusion molding. When tubes made of a sheet of a synthetic resin material are used as the main pipe and sub-pipe, in order to prevent movement or shifting of the main pipe or sub-pipe during the operation, it is preferred to join the pipes together on their lateral sides by fusion bonding. In this case, connection of soft tubes to the connection socket can be accomplished by inserting a short connecting tube into the connection socket of the present invention or imparting slight deformation to the main pipe connecting part and sub-pipe connecting part of the connection socket. Still further, each of the connection socket, main pipe and sub-pipe may be formed of a metal.

According to the present invention, since not only the main pipe but also the sub-pipe can be cleaned very easily without disassembling the once set-up water sprinkling device, degradation in sprinkling efficiency by clogging of spurting holes of the sub-pipe can be effectively prevented and the sprinkling efficiency can be maintained at a desired level assuredly for a long time. Further, by controlling the flow rate adjusting cock appropriately, water can be sprinkled uniformly without substantial influence being imposed by change of the liquid pressure caused along the lengthwise direction of the water sprinkling device. Moreover, even if the main pipe and sub-pipe are composed of a non-flexible material such as a rigid synthetic resin or metal, they can easily be connected to the connection socket by either screw fitting or insertion fitting method. Such feature will result in greater practical advantages as the scale of the water sprinkling device increases. In the present invention, it is intended to remove not only dust or mud but also organic and inorganic materials generated in the interiors of the main pipe and sub-pipe, and therefore, various chemicals and liquids suitable for removal of such materials are used as cleaning liquids. Accordingly, needless to say, the materials of the main pipe, sub-pipe and connection socket should be determined after due consideration of the cleaning liquids to be used.

The water sprinkling device of the present invention can be utilized not only for the agricultural and horticultural purposes, but also for melting snow on railways and roads and melting ice in icebound districts and for irrigating desert lands. The water sprinkling device of the present invention can also be used for cooling purposes.

What we claim is:

1. A liquid sprinkling system employing connection sockets, each of said sockets comprising: a tubular connection portion for connection of a main pipe and at least one tubular connection for connection of a sub-pipe, said main pipe and said sub-pipe being connected between an associated connection socket; said tubular main pipe connection portion and tubular sub-pipe connection portion communicating with each other through an opening disposed proximate a central portion thereof, said sub-pipe connection portion having a single opening for allowing liquid to flow only in one particular axial direction along an axis of said sub-pipe connection portion and an internal closure inside thereof, for preventing flow of liquid in an opposite axial direction of the sub-pipe connection portion; adjusting means for adjusting a flow rate of liquid passing through said opening proximate said central portion; each of said connection sockets being further defined by a cylindrical guide wall inside said sub-pipe connection portion extending at the peripheral edge of said opening up to an upper internal surface of the sub-pipe connection portion and said single opening in the sub-pipe connection portion being a hole provided at one of two diametrically opposing positions thereon in an axial direction of the sub-pipe connection portion, and said flow rate adjusting means being a plug rotatably received in a space defined by said guide wall and provided with a hole flush with said hole in the guide wall being in communication with said opening, said plug being accessible for flow rate control from the outside of said connection socket.

2. A liquid sprinkling device employing a connection socket as set forth in claim 1, wherein: said plug being provided on its lower end with flange means adapted to engage with said peripheral edge of said opening.

3. A liquid sprinkling system of a composite pipe type employing connection sockets, said connection sockets being formed of a tubular connection portion for connection of a main pipe and at least one tubular connection portion for connection of a sub-pipe, said tubular main pipe connection portion and tubular sub-pipe connection portion communicating with each other through an opening disposed proximate a central portion thereof, said tubular sub-pipe connection portion having an internal closure portion disposed proximate said central portion thereof and being further provided with two openings for allowing liquid to flow in both axial directions thereof; said sub-pipe connection portion being additionally provided with at least one opening for allowing liquid to flow in at least one of the opposite directions along the axis of said sub-pipe connection portion, said connection socket further including means for adjusting the flow rate of liquid passing through said opening; said system comprising: a plurality of still other connection sockets, main pipes and sub-pipes connected between said connection sockets and said other connection sockets, said connection sockets and said other connection sockets being alternately arranged with each other, said other connection sockets preventing liquid flow therefrom into the sub-pipe sections and said sub-pipes each having a plurality of holes from which liquid is to caused to flow.

4. A liquid sprinkling device employing connection sockets as set forth in claim 3, wherein: two tubular sub-pipe connection portions are juxtaposed on lateral sides of the main pipe connection portion.

* * * * *